Jan. 9, 1940. H. H. HARRIS 2,186,724
ROLLER UNIT
Filed Nov. 12, 1937
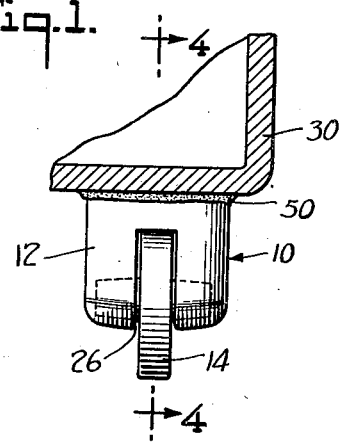
Fig.1.
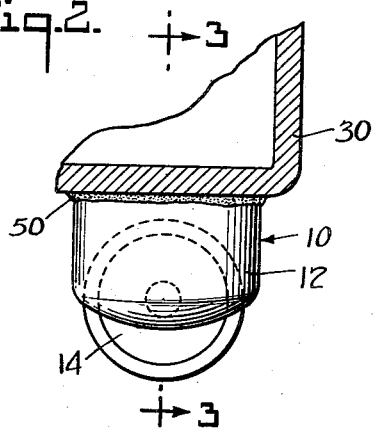
Fig.2.
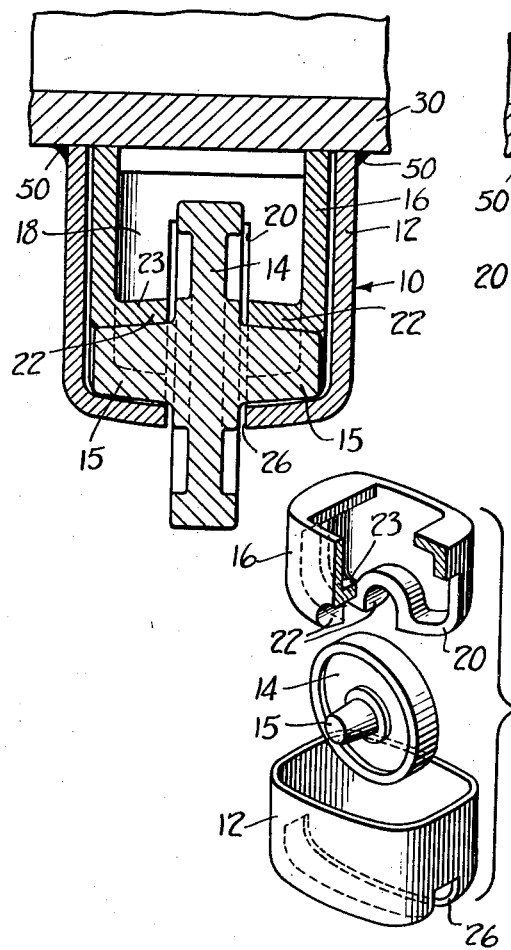
Fig.3.
Fig.5.
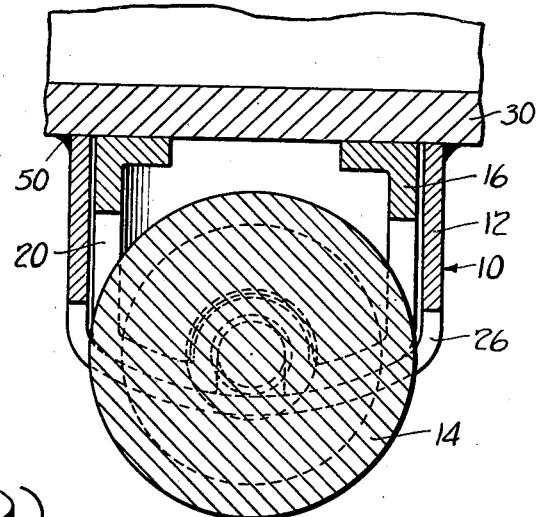
Fig.4.
INVENTOR
Henry H. Harris
BY
Dyke and Schaines
ATTORNEYS Patented Jan. 9, 1940

2,186,724

UNITED STATES PATENT OFFICE 2,186,724

ROLLER UNIT

Henry H. Harris, Champaign, Ill.

Application November 12, 1937, Serial No. 174,158

3 Claims. (Cl. 16—40)

My invention relates generally to means for travelling various types of work supports such as trays, boxes, and the like, through heat treating furnaces. Most of the articles to be heat treated are usually loaded onto flat bottomed supports, commonly called "trays", and travelled through the heat treating furnaces on equally flat skid rails or tracks. The friction thus generated is equally destructive to both the supports and the rails or tracks, and my invention is directed specifically to the provision of a roller unit which can be attached to any conventional form of work support to enable same to be travelled through heat treating or other furnaces more easily and quickly, with expenditure of less power, and with much less friction.

The main object of my invention is the provision of a roller unit composed of relatively few parts, simple and easy to put together and attach for use.

Another object of my invention is the provision of a roller unit composed of parts so shaped that same are received one within the other.

A further object of my invention is the provision of a roller unit composed of parts so sized and shaped as to require no mechanical connection to maintain same in operative relation.

Other objects will in part be pointed out specifically hereinbelow and in part be obvious from the following description of an illustrative embodiment.

In the drawing annexed hereto and forming a part hereof,

Figure 1 is a front elevational view of one form of roller unit constructed according to and embodying my invention, showing same attached to a work support and projecting downwardly therefrom;

Fig. 2 is a side elevational view of the assembly shown in Fig. 1;

Fig. 3 is a section on the line 3—3 of Fig. 2;

Fig. 4 is a section on the line 4—4 of Fig. 1; and

Fig. 5 is an exploded view of the component parts of my roller unit.

Reference numeral 10 indicates the roller unit generally which comprises housing 12, roller or wheel 14 with integral journals 15, 15, and bearing member 16, all of which are one-piece castings of heat and corrosion resisting alloy, preferably of nickel, chromium and iron composition.

The bearing member 16 comprises a hollow block 18 provided with a longitudinal slot 20 through which the roller or wheel 14 projects, as seen in Figs. 3 and 4. Block 18 also contains the rounded, preferably tapered and open-sided bearing slots 22, 22 extending transversely to slot 20, which slots 22, 22 are shaped to receive and provide bearings for the preferably tapered journals 15, 15 of roller 14. The portions of bearing member 16 containing bearing slots 22, 22, are extended or shouldered inwardly to the edges of slot 20, as indicated at 23, to provide a lengthened bearing surface within slots 22, 22 for the journals 15, 15, the length of said journals 15, 15 being substantially the same as the length of bearing slots 22, 22, as shown in Fig. 3.

Housing 12 is similar in shape to bearing 16, and is also provided with a longitudinal slot 26 through which roller or wheel 14 projects. The outer dimensions of bearing member 16 are substantially the same as the inner dimensions of housing 12, and when bearing member 16 is placed within the housing 12 in the relation illustrated in Figs. 3 and 4, there is a close fit between these two members, with little or no intermediate clearance. The journals or axles 15, 15 of roller or wheel 14 are preferably cast integral therewith, as stated, and are of such thickness and taper as to be wholly received within the tapered bearing slots 22, 22 in block 18, the housing 12 serving to retain the journals for rotation within these bearing slots 22, 22. Thus, when the component parts of my roller are assembled in the relation shown in Figs. 3 and 5, a comparatively compact unit is obtained, with axles or journals 15, 15 of wheel 14 retained in slots 22, 22 by the housing 12; a portion of the wheel projecting through slots 20 and 26 of the bearing member 16 and housing 12 respectively.

While I have illustrated my roller unit 10 as applied to a tray device, as 30, it is obvious that same may be applied equally well to a track or to any form of work support used in heat treating processes.

With the parts of the roller unit assembled as above described, the roller or wheel 14 having been put into its place in the bearing member 16 and these parts then inserted through the open end of housing 12, attachment can be made to a tray or other device as by welding the housing 12 in place on such device as indicated at 50. This welding 50 is all that is necessary to secure the roller unit 10 to the device 30, the close fit between the components of the unit sufficing to keep same in operative relation, and particularly when device 30 is loaded. In such case, the combined weight of device 30 and the load will be distributed between wheel or roller 14 and bearing 16, housing 12 supporting no part of the load and functioning merely to maintain the other components in the desired relation shown.

In the form shown, housing 12 is separately formed and welded to the underside of device 30, and provides, in effect, a muffle which protects the roller and bearing from flame impingement, and permits more uniform heating. Additionally, the housing aids in keeping out the scale and other foreign matter which tends to increase friction and wear on the bearings and journals.

My improved roller unit has numerous features of advantage. For one thing, the parts are simple and can be cast at very little expense. For another thing, maintenance cost is low, and the parts can be attached, detached and replaced easily and inexpensively.

Having now described my invention, what I claim and desire to secure by Letters Patent is:

1. A roller unit comprising a hollow bearing member having a longitudinal roller slot therein and containing journal bearing slots, a roller having journals received within the bearing slots, and a supporting housing within which the bearing member and roller are wholly received, said housing enclosing both the roller and the bearing member and having a slot through which the roller extends, said slot being aligned with the longitudinal roller slot.

2. A roller unit comprising a roller, a bearing member therefor, and a housing within which the bearing member and roller are wholly disposed, the roller having tapered journals formed integral therewith, the bearing member comprising a hollow block having a longitudinal roller slot and recessed bearing slots transverse to the roller slot, the journals of the roller being received wholly within the bearing slots with a portion of the roller extending into the interior of the block, the remainder projecting through the roller slot, and the housing having a slot through which the said remainder also projects the housing securing the roller journals against displacement from the bearing slots.

3. A roller unit for attachment to the underside of a travelling work support comprising a hollow bearing member having a longitudinal roller slot therein on the bottom thereof and a pair of bearing slots therein on opposite sides of the roller slot which bearing slots open downwardly, a roller and journals thereon equal in thickness to the depth of the bearing slots, and a hollow housing fitted over and enclosing the bearing member, the housing having a roller slot on the underside thereof coincident with the roller slot in the bearing member, said housing being adapted to be secured to the underside of the work support whereby the bearing member and the roller are supported therewithin in operative relation to the work support.

HENRY H. HARRIS.